July 21, 1964  W. RASKIN  3,141,500
HEAT EXCHANGER COILS OF THE PANEL TYPE
Filed Feb. 14, 1962  2 Sheets-Sheet 1
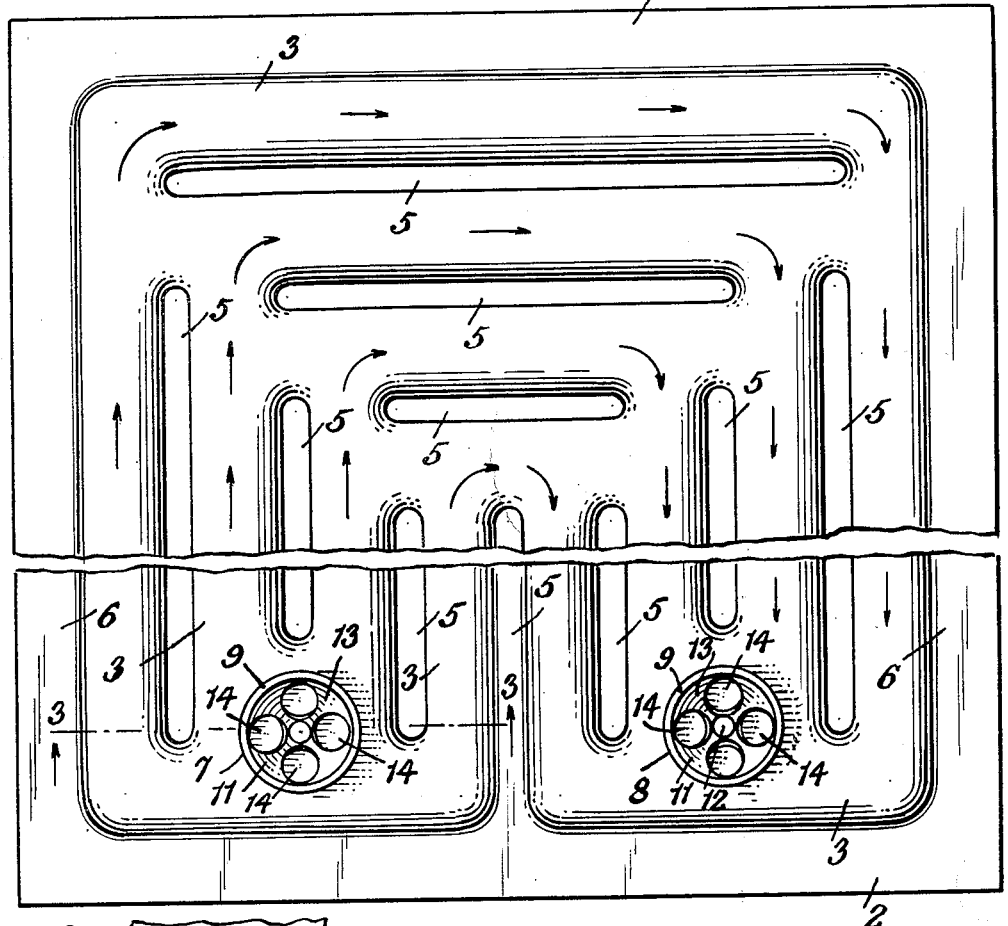
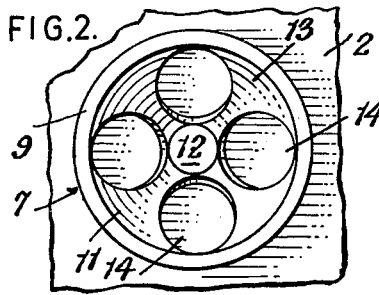
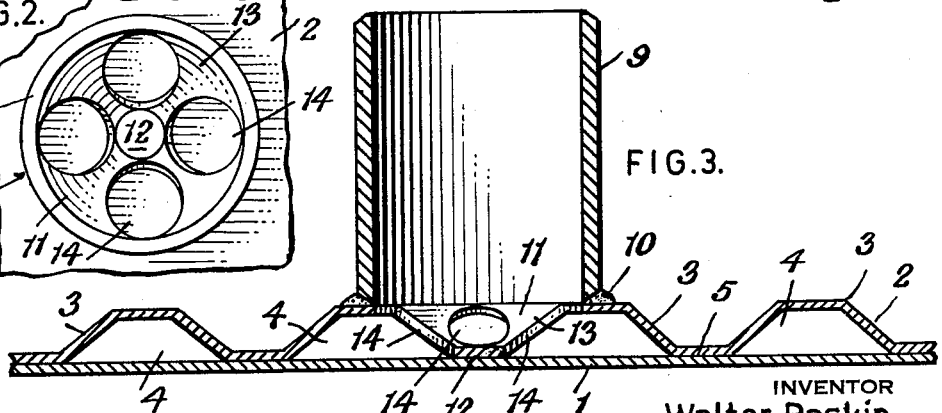
INVENTOR
Walter Raskin
BY
ATTORNEY

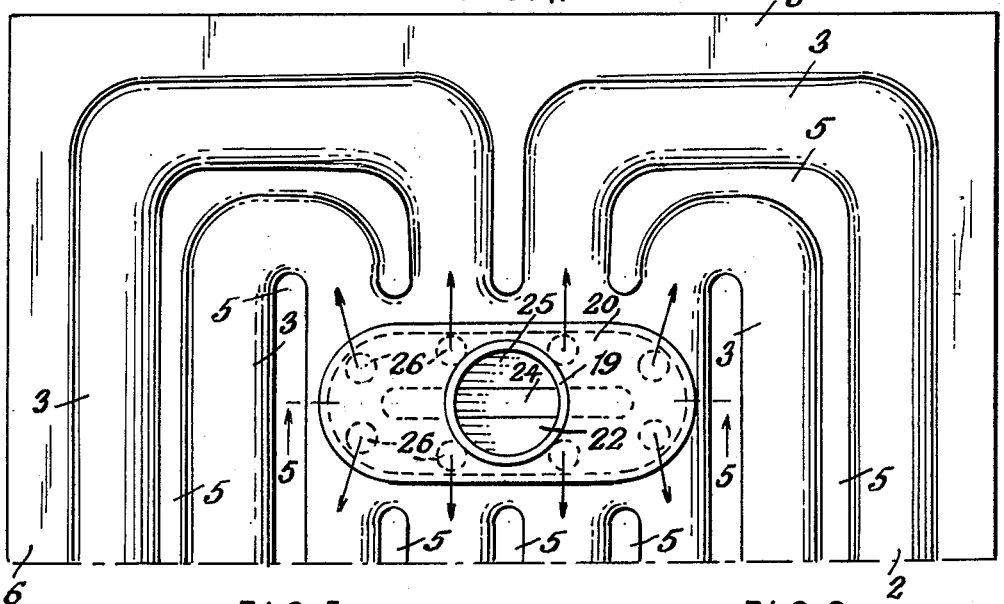
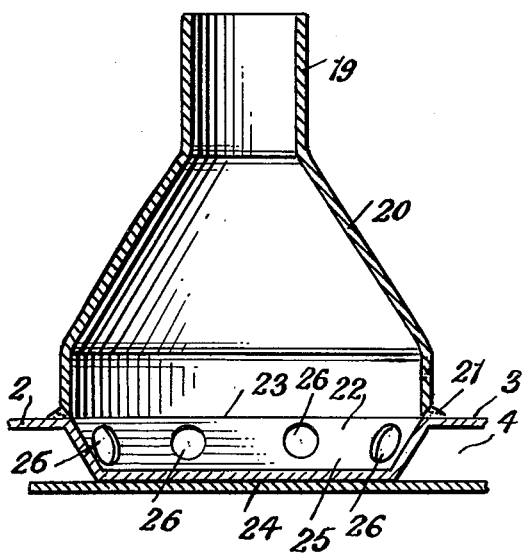
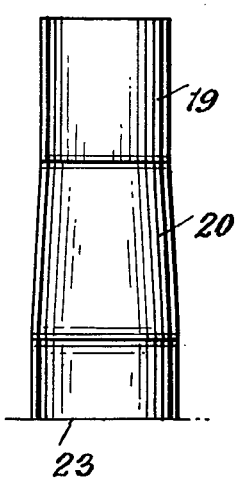

United States Patent Office 3,141,500
Patented July 21, 1964

3,141,500
HEAT EXCHANGER COILS OF THE PANEL TYPE
Walter Raskin, Brooklyn, N.Y., assignor to Dean Products, Inc., Brooklyn, N.Y., a corporation of New York
Filed Feb. 14, 1962, Ser. No. 173,286
4 Claims. (Cl. 165—170)

This invention relates to heat exchanger units used for heating as well as for cooling of the panel type, which consist of a pair of plates facially united and with at least one of the plates embossed or corrugated in a manner to provide flow passages or channels between it and its companion plate.

In the design of panels or plate type heat transfer units, a limitation is imposed in that the flow channels shall be as compact as possible and still provide adequate flow to all of the heat exchange surfaces. A problem which arises is that if there are many small channels arranged for a series flow, the fluid pressure drop may be too great. On the other hand, if there are many channels arranged for parallel flow, some of the channels may not receive their full share of the fluid flow unless manifolded with headers having areas of appropriate size. In panel units or panel coils, large headers provide operating pressure as well as construction problems, since by their provision they leave large unsupported areas in the plate to which they are attached, which areas may not satisfactorily handle the pressure frequently encountered.

It is therefore one of the objects of the present invention to provide headers constituting an inlet and/or outlet for the exchanger fluid, and which shall be so arranged that it will not require attachment to the embossed or corrugated plate in a manner to produce large unsupported areas in such plate.

It is an object of the invention to provide an arrangement of a header by means of which an adequate flow is provided to each flow channel associated with the header.

Another object is to provide a multiport distributor which is integral with the panel coil.

More particularly, the invention contemplates the provision of an embossed or corrugated plate facially attached to another plate appropriately embossed or unembossed, with a depression or recess formed in the corrugated plate, the base of the depression or recess being joined to the other plate. The depression or recess is defined as a dam, formed with a plurality of orifices which communicate with the flow channels formed by the corrugations, and a sleeve or pipe is attached to the corrugated plate to surround the depression or recess therein.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a face view of a heat exchanger of the panel type constructed in accordance with the invention;

FIG. 2 is a top plan view of one of the headers for the panel;

FIG. 3 is a sectional view, taken substantially on the line 3—3 of FIG. 1, looking in the direction of the arrows;

FIG. 4 is a face view of another embodiment of the invention;

FIG. 5 is a sectional view, taken substantially on the line 5—5 of FIG. 4, looking in the direction of the arrows, and FIG. 6 is an end view of the tube or sleeve shown in FIG. 5.

In the form shown in FIGS. 1 to 3 inclusive, the body of the improved heat exchanger or panel type coil is composed of a pair of facially-attached sheet plates indicated respectively at 1 and 2. At least one of these plates is embossed with ribs or corrugations 3 to thereby provide passages or channels between them and the plate 1 and through which the fluid or gas is circulated. The corrugated plate 2 is secured by welding or otherwise to a face of the plate 1, the areas juncture between the corrugations being indicated at 5. In addition, the two plates 1 and 2 are joined together in their marginal edge portions or in the area indicated at 6.

The panel disclosed in FIG. 1 is provided with headers 7 and 8, that shown at 7 constituting an inlet and that shown at 8 constituting an outlet. Both of the headers may be of similar construction or may differ according to special requirements. In the form shown, each of the headers includes a tube or sleeve 9, having one end welded or otherwise connected, as shown at 10, to the outer face of the corrugated plate 2 at the top or crest of the corrugations or elevated area of the plate.

The tube 9 is secured to the face of the plate 2 directly over a dam or depression 11 formed therein, which recess has its base welded or otherwise connected as at 12 to the face of the plate 1. The depression 11 together with the surrounding wall 13 forms a dam having a plurality of openings or orifices 14. Four of these orifices are shown, although this number may be increased or decreased according to various requirements. The openings or orifices 14 are so arranged that they serve to establish communication between the interior of the sleeve 9 and a number of the flow passages 4 in the panel so that adequate flow of the fluid through the passages will be assured. In FIG. 1 the flow of the fluid through the device from the inlet 7 to the outlet 8 is designated by the arrows.

By the arrangement disclosed, wherein a plurality of openings or orifices are provided at a substantially central point between a number of channels, an adequate flow of the fluid is provided for each channel that is associated with the header of the coil. This provides for the full distribution of the fluid and imposes no penalty for excessive pressure drop.

In the embodiment of the invention shown in FIGS. 4 to 6 inclusive, the inlet tube is in the form of a sleeve 19 of inverted funnel shape or flared at its end as indicated at 20 and welded or otherwise joined over the dam at 21 to the elevated part or crest of the corrugations and over the depression or recess 22 which substantially conforms in shape to the elongated or ovate end 23 of the sleeve 19. Said dam or depression 22 has its base portion welded or otherwise joined to the face of the flat plate 1 in the area indicated at 24. In the wall 25 of the dam or depression 22 is provided a number of orifices or openings 26, eight in number being shown, for communication with the various fluid passages or channels to afford adequate distribution of the fluid through the coil. The arrows shown in FIG. 4 indicate how the fluid, entering through the tube 19, will flow through the several openings or orifices and through the various channels or passages of the coil.

From the foregoing, the operation of the improved device will be readily apparent. The fluid, being distributed by its passage through a plurality of orifices, passes through the channels of the coil and provides for flow of the fluid, so that all of the channels in the coil receive an adequate share of the flow. The headers are so arranged that the central welding or joints of the base of each recess to the other plate insures strength sufficient to resist usual pressures that may be encountered.

While I have shown that the inlet or outlet arrangement is provided with definite numbers of orifices, it will be understood that the number and arrangement of these orifices, and the shape of the depression or recess in which they are formed, may be varied to meet different requirements, such as for example, the number of channels to be accommodated.

Having thus described a single embodiment of the invention, it is obvious that the same is not to be restricted thereto, but is broad enough to cover all structures coming within the scope of the annexed claims.

What I claim is:

1. A heat exchanger panel coil comprising a plurality of facially-attached plates, at least one of the plates being corrugated to provide it with a plurality of fluid channels, a depression formed in said plate and defining a cavity, said depression having an inclined side wall, a sleeve mounted over the concave side of the depression and forming an extension of the same, and the inclined wall of the depression having a plurality of orifices surrounded by the sleeve communicating respectively with the channels to form a multiport distribution for the fluid.

2. A heat exchanger panel coil as provided for in claim 1, wherein the depression is frustro-conical and the sleeve is cylindrical.

3. A heat exchanger panel coil as provided for in claim 1, wherein the sleeve is enlarged at its meeting end with the plate in which the depression is formed, and the depression is substantially ovate in shape.

4. A heat exchanger panel coil comprising, a pair of plates facially joined together, at least one of the plates being corrugated to provide fluid channels between it and the other plate, the corrugated plate being formed with a depression joined at its base to the other plate, the depression being defined by an inclined side wall having a plurality of orifices, said orifices being in communication with the fluid channels, and a sleeve attached to the corrugated plate and surrounding the depression and projecting therefrom.

References Cited in the file of this patent

UNITED STATES PATENTS

| | | |
|---|---|---|
| 2,621,491 | Coleman | Dec. 16, 1952 |
| 2,626,130 | Raskin | Jan. 20, 1953 |